June 19, 1962    W. P. BARIE, JR., ETAL    3,040,081
SEPARATION OF OXYGENATED HYDROCARBON
Filed March 27, 1959
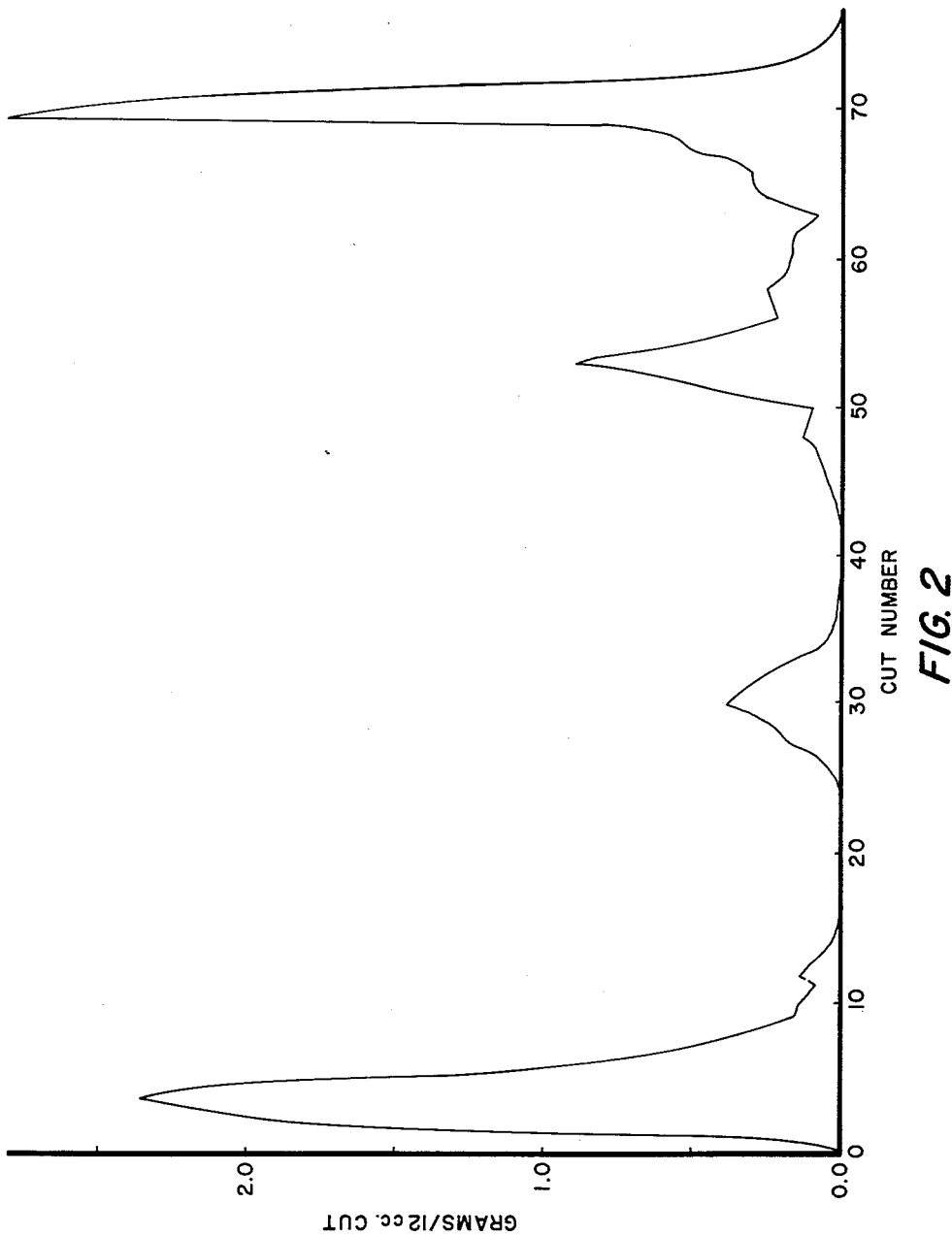
FIG. 2
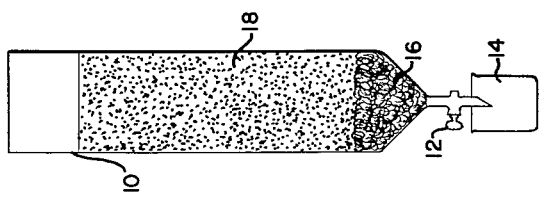
FIG. I
INVENTORS.
WALTER P. BARIE JR.
CHARLES M. SELWITZ
BY
ATTORNEY – # United States Patent Office 3,040,081
Patented June 19, 1962

3,040,081
SEPARATION OF OXYGENATED HYDROCARBON
Walter P. Barie, Jr., Pittsburgh, and Charles M. Selwitz, Monroeville, Pa., assignors to Gulf Research & Development Company, Pittsburgh, Pa., a corporation of Delaware
Filed Mar. 27, 1959, Ser. No. 802,547
1 Claim. (Cl. 260—452)

The present invention is concerned with the separation of organic materials by selective desorption from silica gel, and relates more particularly to obtaining substantial separations of oxygenated hydrocarbons into four general fractions, namely, (1) a fraction enriched in monocarboxylic acids and their esters, (2) a fraction enriched in monohydroxycarboxylic acids and their esters, (3) a fraction enriched in polymerized monohydroxycarboxylic acids and their esters, and (4) a fraction enriched in dicarboxylic acids and their esters.

Inasmuch as the oxidation of paraffins, fatty acids and other long chain aliphatic compounds produce complex mixtures of oxygenated hydrocarbons, it is a matter of substantial importance to achieve a rectification of such mixtures or the higher molecular weight portion of such mixtures sufficient to separate the four general fractions identified above. Also, the matter is of further importance because the Fischer-Tropsch and Oxo processes produce oxygenated hydrocarbons of the character suitable for separation according to the invention, and this also applies to animal fats and partially hydrolyzed animal fats.

It has been found that the desired separation can be effected according to the invention by selectively desorbing the fractions from silica gel, and that the desired separations can, as is preferred, be effected without appreciable hydrolysis of esters contained in the mixture. Such findings are surprising inasmuch as efforts to separate the fractions by selective desorption from alumina and calcium carbonate have been unsuccessful, and in further view of the fact that while an extensive technology of separation of substances by selective desorption from silica gel has developed, the prior art indicates that the utility of silica gel, insofar as oxygenated hydrocarbons are concerned, extends only to separating such substances as an entire group from other substantially less polar materials, and this is particularly true in relation to selective desorption being conducted under substantially nonhydrolyzing conditions.

Broadly, the invention comprises the step of introducing a mixture containing oxygenated hydrocarbons into one end of a silica gel column, and thereafter eluting the column with an eluant composed of normally liquid constituents having a boiling point of less than about 150° C. at 760 mm. Hg selected from the class consisting of of paraffins, olefins, saturated halogenated paraffins, aromatic hydrocarbons, halogenated aromatic hydrocarbons, ethers, ketones, alcohols, and mixtures thereof that is introduced into said one end of the column, with the composition of the eluant being varied progressively to increase from less than about 5 to more than about 200 in adsorption index (hereinafter defined), whereby the four fractions of oxygenated hydrocarbons previously listed serially emerge from the column with the eluant.

Preferably, the mixture to be separated is introduced into a silica gel column as a concentrated solute in a solvent of the same character as the eluant initially to be used having an adsorption index of zero to less than about 5. Such introduction of the mixture is not essential inasmuch as it will suffice to introduce the mixture as a finely divided solid or as a liquid provided that the initial rate of eluant introduction is sufficiently slow as to achieve substantially total solution of the mixture prior to any of the mixture components being eluted from the column.

The separation process of the invention is applicable to oxygenated hydrocarbons of the types previously specified having molecular weights for the acids ranging from about 66 to about 600, and from about 120 to about 1200 for the esters.

The invention will be best understood in the light of the following description of a preferred mode of the practice thereof taken in conjunction with the accompanying drawings, wherein:

FIGURE 1 is a schematic showing of apparatus suitable for the practice of the invention; and FIGURE 2 is a graph illustrating the weight of eluted material versus quantity of eluant used.

As an example of the practice of the invention, a complex mixture of oxygenated hydrocarbons was obtained by oxidizing 12-tricosanone with air in the presence of manganese naphthanate. Such oxidation was accomplished by placing 100 grams of 12-tricosanone and 2 cc. of 6 percent manganese naphthenate in naphtha in a 250 ml. capacity reaction pot having a 2 inch diameter fritted glass disk at the bottom. The pot was heated and when the temeprature reached 150° C., dry air was passed through the melt at 2 cubic feet per hour, with the melt being vigorously stirred. The temperature was then increased to 160° C. over an hour period, and the temperature was thereafter maintained within 3° C. of such level for an additional five hours (with the introduction of air and the stirring of melt being continued throughout this period). The residue of three such runs were combined and weighed 232.1 grams, while a total of 107.5 grams of overhead product was collected.

A schematic illustration of apparatus with which the residue was separated is shown in FIGURE 1, wherein the numeral 10 designates a glass column reduced at its lower end and fitted with a stop cock 12. The column 10 is arranged to discharge into a receiver vessel or beaker 14. The column 10, which was 1 inch in internal diameter, was prepared for use by packing the lower reduced end thereof with glass wool 16 and by pouring in a sufficient amount of a slurry of 100 mesh Malinckrodt silica gel in hexane to form a 41 inch column of silica gel 18 when settled, after which the stop cock 12 was opened to permit removal of all the hexane except for a sufficient amount to cover the upper surface of the silica gel 18 in the column 10, and then the stop cock 12 was closed.

With the silica gel column 10 readied for use as outlined above, a solution of 26.8 grams of the oxidation product residue, obtained from the oxidation of 12-tricosanone in the manner previously described, in 100 cc. of hexane was poured into the upper end of the column 10. The stop cock 12 was then opened so that the rate of discharge therefrom was approximately 20 cc. per minute, and the following eluotropic series was used to develop the chromatogram, it being understood that each successive member of the eluotropic series was added after the preceding member had substantially passed into the column:

250 ml. of hexane
75 ml. of isooctane
50 ml. of 1% chloroform in n-hexane
51 ml. of 2% chloroform in n-hexane
52 mil. of 4% chloroform in n-hexane
54 ml. of 8% chloroform in n-hexane
60 ml. of 16% chloroform in n-hexane
50 ml. of 32% chloroform in n-hexane
100 ml. of 100% chloroform
50 ml. of 1% methanol in chloroform
50 ml. of 2% methanol in chloroform
50 ml. of 4% methanol in chloroform 50 ml. of 10% methanol in chloroform
50 ml. of 25% methanol in chloroform
50 ml. of 50% methanol in chloroform
150 ml. of 100% methanol.

The first 70 cc. of hexane to wash through the column 10 was found to be substantially pure hexane, after which individual 12 cc. samples or cuts of the effluent were collected and isolated, the first of such 12 cc. cuts was the first found to contain any color. The material contained in each of the 12 cc. cuts was isolated by solvent evaporation, and the following table designates the number of the successive 12 cc. cuts by numerals ranging from 1 to 75 and gives the weight in grams of the eluted material contained in the respective cuts:

TABLE I

| Cut No.: | Weight | Cut No.: | Weight |
|---|---|---|---|
| 1 | 0.20 | 49 | 0.11 |
| 2 | 1.65 | 50 | 0.10 |
| 3 | 2.02 | 51 | 0.39 |
| 4 | 2.40 | 52 | 0.50 |
| 5 | 1.74 | 53 | 0.90 |
| 6 | 1.04 | 54 | 0.71 |
| 7 | 0.61 | 55 | 0.42 |
| 8 | 0.31 | 56 | 0.21 |
| 9 | 0.16 | 57 | 0.23 |
| 10 | 0.14 | 58 | 0.25 |
| 11 | 0.08 | 59 | 0.17 |
| 12 | 0.13 | 60 | 0.17 |
| 13 | 0.09 | 61 | 0.17 |
| 14–26 | <0.03 | 62 | 0.11 |
| 27 | 0.16 | 63 | 0.07 |
| 28 | 0.20 | 64 | 0.23 |
| 29 | 0.26 | 65 | 0.30 |
| 30 | 0.38 | 66 | 0.30 |
| 31 | 0.3338 | 67 | 0.51 |
| 32 | 0.25 | 68 | 0.54 |
| 33 | 0.17 | 69 | 0.89 |
| 34 | 0.05 | 70 | 2.84 |
| 35–44 | <0.03 | 71 | 2.32 |
| 45 | 0.06 | 72 | 0.70 |
| 46 | 0.06 | 73 | 0.22 |
| 47 | 0.07 | 74 | 0.07 |
| 48 | 0.14 | 75 | 0.03 |

The data shown in Table I is plotted in the graph constituting FIGURE 2 of the drawings. It will be evident upon considering the foregoing table and particularly upon inspection of the graph that the material eluted from the column 10 is separated into four rather sharply defined peaks. The materials contained in cuts 1–13, 27–34, 45–62, and 64–75 were analyzed and found to contain the indicated weight percentages of the initial charge, respectively.

Peak I:
    31.2%—mainly fatty acids
    8.0%—12-tricosanone
Peak II: 6.7%—hydroxy acids and hydroxy acid esters
Peak III: 17.1%—polymerized hydroxy acid esters containing about three to four units per molecule
Peak IV: 33.2%—dibasic acids and esters of dibasic acids The eluotropic series used in the example given ranged from about 0 to about 270 in adsorption index. As used in the specification and the claims, the expression "adsorption index" is that defined in U.S. Patent No. 2,585,492 issued to Olsen February 12, 1952, wherein the adsorption index of a compound is stated to be the apparent number of cubic centimeters of the compound adsorbed by one kilogram of the silica gel when the latter is in equilibrium with a solution consisting of 0.2 percent of such compound and 99.8 percent of isooctane.

As so defined and taken from the aforementioned Olsen patent, there is listed in Table II the adsorption indices of a number of organic solvents on silica gel:

TABLE II

| Compound: | Adsorption Index |
|---|---|
| Saturate hydrocarbons | about 0 |
| Cyclohexene | 3.3 |
| Trichloroethylene | 5.8 |
| 3-chloropentane | 8.2 |
| m-Chlorobenzotrifluoride | 8.6 |
| Chloroform | 12 |
| o-Dichlorbenzene | 15 |
| Chlorbenzene | 19 |
| Methylene chloride | 21 |
| Benzene | 24 |
| N-Propylbromide | 26 |
| s-Tetrachlorethane | 28 |
| Brombenzene | 30 |
| Tert-butylchloride | 31 |
| Toluene | 31 |
| Ethylene dichloride | 38 |
| Iso-amyl chloride | 50 |
| Benzotrichloride | 54 |
| 1,2,3-trichloropropane | 55 |
| Benzyl chloride | 64 |
| Benzal chloride | 90 |
| 1,4-dichlorobutane | 91 |
| Nitropropane | 101 |
| Benzyl mercaptan | 136 |
| Dioxane | 145 |
| Nitrobenzene | 162 |
| m-Nitrobenzotrifluoride | 181 |
| Methyl salicylate | 189 |
| Benzaldehyde | 190 |
| Ethyl acetate | 195 |
| Benzyl ether | 198 |
| Pyridine | 204 |
| Diisobutylketone | 212 |
| Diisopropyl ether | 212 |
| m-Aminobenzotrifluoride | 228 |
| Cyclohexanol | 252 |
| Sec-butyl alcohol | 260 |
| Ethyl alcohol | 260 |
| 2-methyl-2,4-pentanediol | 279 |
| n-Butyl amine | 283 |
| Morpholine | 286 |

Representative of suitable compounds for eluant compositional use are:

(1) Paraffins: pentane, hexane, isopentane, cyclohexane, methylcyclopentane, methylcyclohexane, isooctane, and 2,3-dimethylpentane.
(2) Olefins: hexene-1, heptene-1, cyclopentene, cis octene-2, 2,3-dimethylhexene-1, and diisobutylene.
(3) Saturated halogenated paraffins: 3-chlorohexane, methyl chloride, methylene chloride, chloroform, and carbon tetrachloride.
(4) Aromatic hydrocarbons: benzene, ethylbenzene, toluene, paraxylene, metaxylene, and orthoxylene.
(5) Halogenated aromatic hydrocarbons: chlorobenzene, fluorobenzene, fluorotoluene, and meta-fluorochlorobenzene.
(6) Ethers: diethyl ether, tetrahydrofuran, anisole, di-n-butyl ether, and 2-methyl-5-ethyltetrahydrofuran.
(7) Ketones: acetone, methyl ethyl ketone, cyclopentanone, and diisopropyl ketone.
(8) Alcohols: methanol, ethanol, n-propanol, isopropanol, n-butanol, and cyclopentanol.

It is not essential that the separation process be conducted to separate each of four fractions from each other, it having been found that an eluant having an adsorption index of about zero to about 3.0 and particularly of from about 0.5 to about 2.0 will readily elute monocarboxylic acids and their esters from silica gel; but will elute monohydroxycarboxylic acids, polymerized monohydroxylic acids, dicarboxylic acids, and the esters of such acids from silica gel at a relatively much slower rate. Similarly an eluant having an adsorption index of about 4 to about 15 and particularly of from about 6 to about 10 will readily elute monocarboxylic acids, monohydroxycarboxylic acids, and the esters of such acids; but will elute polymerized monohydroxycarboxylic acids, dicarboxylic acids, and the esters of such acids at a relatively much slower rate. Finally, an eluant having an adsorption index of about 20 to about 50 and particularly of from about 22 to about 30 will readily elute monocarboxylic acids, monohydroxycarboxylic acids, polymerized monohydroxycarboxylic acids, and the esters of such acids; but will elute dicarboxylic acids and their esters at a relatively slower rate. In view of these considerations, only one or two separation cleavages can be made, if desired, in separating a mixture of oxygenated hydrocarbons, rather than the three of which the separation process of the invention is capable.

In the practice of the invention, whether for the purpose of accomplishing any one of the three single separation cleavages, any one of the three dual separation cleavages, or for the triple separation cleavage separating the four fractions; the quantity of eluant to be used and the relative amounts of eluant to be used of differing adsorption indices depend essentially upon two easily ascertained factors, namely, the relative amounts of the fractions of the mixture to be separated and their actual compositions, and the particular eluant compositions used and their actual adsorption indices.

In general, selection of the various eluant adsorption indices needed for any particularly desired separation cleavage or combination of cleavages can be readily made by those skilled in the art upon reference to the preceding paragraph. Upon selecting a desired adsorption index, an eluant composition possessing this characteristic can be either a pure compound of one of the classes previously indicated as suitable eluant components having the desired adsorption index, or a mixture of two or more of such components having a resultant adsorption index of the desired value. With a degree of accuracy usually suitable for the purpose, the adsorption index of a mixture of compounds is roughly equal to the sum of the adsorption indices of the various compounds present, each multiplied by the mole fraction of the individual compounds. This approximate relation enables formulating eluants of desired adsorption indices with maximum economy and most effective use of readily available materials.

In general, the quantity of eluant having a particular adsorption index to be used is determined by observing the effluent from the silica gel column 10. Of course, when separating generally similar mixtures, a satisfactory eluotropic series can be worked out from experience. However, with little or no prior experience or special knowledge of the mixture being separated, it is necessary that either continuous or frequent observations be made of the effluent from the silica gel column 10 particularly as to the concentration of eluted materials therein, so that effluent portions can be isolated for subsequent recovery of eluted materials and the adsorption index of the eluant can be appropriately adjusted. In other words, the completion of elution of a fraction such as constituting any one of the eluted material peaks shown in FIGURE 2 can be determined by the great reduction in the amount of eluted material present in the effluent.

Observation of the variations in concentration of the amount of eluted material in the effluent from the silica gel column 10 can be conducted in many ways. For example, spot checks can be made of periodically taken fixed volume cuts by weighing the eluted material after the eluant has been removed therefrom by solvent evaporation or other suitable separation procedure. Plotting the results of such spot checks will plainly indicate the time at which the elution of a peak has been completed. An alternative mode of effluent observation can be based on the fact that acid substances are usually present in the various fractions, in which case titration with base made with respect to minute periodically taken cuts will show when the elution of a peak has been essentially completed. With either of these methods of effluent observation, it will be noted that the spot tests or checks need not be conducted hurriedly, inasmuch as the stop cock 12 can be closed or partially closed for sufficient intervals to afford adequate time to conduct the tests.

Observation of the effluent to detect variations in concentration of eluted material can be based on physical observations such as obtained on passing the effluent through an infrared or ultraviolet spectrophotometer; or a density balance apparatus; or a refractometer. Any of these observational techniques can be employed to greatest advantage in detecting effluent compositional variations due to the amount of eluted material therein, when such measurements are made differentially with respect to a reference stream having its composition adjusted to be that of the eluant (other than as to eluted material) emerging from the silica gel column 10.

It is believed that the principles of the invention have been described in sufficient detail to convey a full and complete understanding thereof to those skilled in the art. It will be apparent that the invention is susceptible to numerous variations from the specifically described modes of practice thereof, and accordingly attention should be directed to the appended claim in order to ascertain the actual scope of the invention.

We claim:

The method of treating a mixture of oxygenated hydrocarbons, said mixture comprising monocarboxylic acids, monohydroxycarboxylic acids, polymerized monohydroxycarboxylic acids, dicarboxylic acids, and the esters of such acids, to separate said oxygenated hydrocarbons into four fractions comprising a fraction enriched in monocarboxylic acids and their esters, a fraction enriched in monohydroxycarboxylic acids and their esters, a fraction enriched in polymerized monohydroxycarboxylic acids and their esters, and a fraction enriched in dicarboxylic acids and their esters; comprising the steps of introducing the mixture into one end of a silica gel column, and thereafter eluting the column with an eluant composed of normally liquid constituents having a boiling point of less than about 150° C. at 760 mm. Hg selected from the class consisting of paraffins, olefins, saturated halogenated paraffins, aromatic hydrocarbons, halogenated aromatic hydrocarbons, ethers, ketones, alcohols, and mixtures thereof that is introduced into said one end of the column, with the composition of the eluant being gradually changed so as to cause the adsorption index of the eluant to increase progressively from about 0 to about 3, then from about 4 to about 15, and then from about 20 to about 50, and thereafter to more than about 200, whereby said fractions serially emerge from the column with the eluant in the order named above.

References Cited in the file of this patent

UNITED STATES PATENTS

| 2,585,492 | Olsen | Feb. 12, 1952 |
| 2,744,067 | Higuchi | May 1, 1956 |
| 2,905,704 | Hirschler | Sept. 22, 1959 |

FOREIGN PATENTS

| 747,903 | Great Britain | Apr. 18, 1956 |